(12) United States Patent
Song et al.

(10) Patent No.: US 9,806,366 B2
(45) Date of Patent: Oct. 31, 2017

(54) METHOD AND SYSTEM FOR REBALANCING ELECTROLYTES IN A REDOX FLOW BATTERY SYSTEM

(71) Applicant: ESS TECH, INC., Portland, OR (US)

(72) Inventors: Yang Song, West Linn, OR (US); Craig E. Evans, West Linn, OR (US)

(73) Assignee: ESS Tech, Inc., Portland, OR (US)

( * ) Notice: Subject to any disclaimer, the term of this patent is extended or adjusted under 35 U.S.C. 154(b) by 0 days.

(21) Appl. No.: 15/297,011

(22) Filed: Oct. 18, 2016

(65) Prior Publication Data

US 2017/0040630 A1 Feb. 9, 2017

Related U.S. Application Data

(62) Division of application No. 14/199,794, filed on Mar. 6, 2014, now Pat. No. 9,509,011.

(60) Provisional application No. 61/832,671, filed on Jun. 7, 2013.

(51) Int. Cl.
*H01M 4/00* (2006.01)
*H01M 8/06* (2016.01)
*H01M 8/18* (2006.01)
*H01M 8/20* (2006.01)

(52) U.S. Cl.
CPC ......... *H01M 8/0693* (2013.01); *H01M 8/188* (2013.01); *H01M 8/20* (2013.01); *Y02E 60/528* (2013.01)

(58) Field of Classification Search
CPC ....................................................... H01M 4/00
See application file for complete search history.

(56) References Cited

U.S. PATENT DOCUMENTS

| 4,159,366 A | 6/1979 | Thaller |
| 5,439,757 A | 8/1995 | Zito |
| 7,517,608 B2 | 4/2009 | Brereton et al. |
| 2006/0251959 A1* | 11/2006 | Karamanev ......... H01M 4/8652 429/101 |

(Continued)

FOREIGN PATENT DOCUMENTS

| JP | H06260204 A | 9/1994 |
| WO | 2012167057 A2 | 12/2012 |

OTHER PUBLICATIONS

Nagayama, M. et al., "The Anodic Oxidation of Iron in a Neutral Solution: I. the Nature and Composition of the Passive Film," Journal of the Electrochemical Society, vol. 109, No. 9, Sep. 1962, 10 pages.

(Continued)

*Primary Examiner* — Jacob Marks
(74) *Attorney, Agent, or Firm* — McCoy Russell LLP

(57) ABSTRACT

A redox flow battery system is provided. The system includes a positive electrode in fluid communication with a positive electrolyte comprising a first metal ion and a negative electrode in fluid communication with a negative electrolyte comprising a second metal ion. An electrically insulating ion conducting surface is provided separating the positive electrode from the negative electrode. Further, the system includes a catalyst surface in fluid communication with the first metal ion, the second metal ion, or a combination thereof, and hydrogen gas, wherein the hydrogen gas and the first metal ion, the second metal ion, or a combination thereof are fluidly contacted at the catalyst surface.

19 Claims, 8 Drawing Sheets

(56) References Cited

U.S. PATENT DOCUMENTS

| | | |
|---|---|---|
| 2010/0092843 A1 | 4/2010 | Conway |
| 2011/0086247 A1 | 4/2011 | Keshavarz et al. |
| 2013/0084482 A1 | 4/2013 | Chang et al. |
| 2014/0272483 A1 | 9/2014 | Pham et al. |

OTHER PUBLICATIONS

Nagayama, M. et al., "The Anodic Oxidation of Iron in a Neutral Solution: II. Effect of Ferrous Ion and pH on the Behavior of Passive Iron," Journal of the Electrochemical Society, vol. 110, No. 6, Jun. 1963, 11 pages.

Hruska, L. et al., "Investigation of Factors Affecting Performance of the Iron-Redox Battery," Journal of the Electrochemical Society, vol. 128, No. 1, Jan. 1981, 8 pages.

Izaki, M. et al., "Hardness and Carbon Content of Fe Electroplate from Sulfate Bath Containing I-Ascorbic Acid and Citric Acid," Journal of the Surface Finishing Society of Japan, vol. 40, No. 11, Nov. 1989, 3 pages.

Fujiwara, Y. et al., "Effect on Hydroxycarboxylic Acids on the Electrodeposition of Fe—C Alloys," Denki Kagaku, vol. 51, No. 7, Jul. 1993, 3 pages.

Fujiwara, Y. et al., "Electrodeposition of Fe—C Alloys from Baths Containing Dicarboxylic Acids with a Linear Alkyl Chain," Journal of the Electrochemical Society, vol. 143, No. 8, Aug. 1996, 7 pages.

Noah, K. et al., "Hydrogen Reduction of Ferric Ions for Use in Copper Electrowinning," Idaho National Engineering and Environmental Laboratory Report, Jan. 2005, 19 pages.

Chandrasekar, M. et al., "Pulse and pulse reverse plating—Conceptual, advantages and applications," Electrochimica Acta, vol. 53, No. 8, Mar. 10, 2008, Available Online Jan. 15, 2008, 10 pages.

Mellentine, J., "Performance Characterization and Cost Assessment of an Iron Hybrid Flow Battery," Masters Thesis, University of Iceland, Jan. 28, 2011, 136 pages.

ISA Korean Intellectual Property Office, International Search Report and Written Opinion Issued in Application No. PCT/US2015/017690, May 29, 2015, WIPO, 15 pages.

\* cited by examiner

METHOD AND SYSTEM FOR REBALANCING ELECTROLYTES IN A REDOX FLOW BATTERY SYSTEM

CROSS-REFERENCE TO RELATED APPLICATIONS

The present application is a divisional of U.S. patent application Ser. No. 14/199,794 entitled "METHOD AND SYSTEM FOR REBALANCING ELECTROLYTES IN A REDOX FLOW BATTERY SYSTEM", filed Mar. 6, 2014. U.S. patent application Ser. No. 14/199,794 claims priority to U.S. Patent Application No. 61/832,671 entitled "METHOD AND SYSTEM FOR REBALANCING ELECTROLYTES IN A REDOX FLOW BATTERY SYSTEM", filed Jun. 7, 2013. The entire contents of the above-referenced applications are hereby incorporated by reference for all purposes.

GOVERNMENT LICENSE RIGHTS

This invention was made with government support under contract no. DE-AR0000261 awarded by the DOE, Office of ARPA-E. The government has certain rights in the invention.

BACKGROUND AND SUMMARY

Redox flow batteries store electrical energy in a chemical form and subsequently dispense the stored energy in an electrical form via a spontaneous reverse redox reaction. Conversion between the chemical and electrical energy occurs in a reactor cell. One issue with conventional redox flow batteries is that over time the electrolyte state of charge can become imbalanced, thereby decreasing battery capacity due to hydrogen generation from the electrolyte via side reactions. For example, hydrogen gas is emitted as an electrochemical byproduct during battery charging. As another example, in a hybrid redox flow battery, hydrogen gas is emitted as a byproduct of a corrosion reaction at a negative (plating) electrode. Because hydrogen gas production consumes protons instead of the electro-active material in the battery, hydrogen gas generation not only results in an electrolyte state of charge imbalance which reduces the battery capacity, but also a rise in electrolyte pH which can lead to electrolyte stability issues.

Electrolyte rebalancing methods and systems typically employ an auxiliary rebalancing cell (electrochemical or photochemical) to convert the hydrogen gas back to protons via an auxiliary electrochemical reaction. For example, Thaller (U.S. Pat. No. 4,159,366) discloses a redox flow system including an electrochemical rebalancing cell, where hydrogen gas evolved from the battery negative electrode flows through the rebalancing cell anode and positive electrolyte flows through the rebalancing cell cathode. Electrochemical reactions occurring at the electrodes of the rebalancing cell convert gaseous hydrogen back to protons, consume the imbalanced positive electrolyte, and rebalance the electrochemical capacity of the positive and negative electrolytes.

The inventors have recognized various issues with the above system. Namely, electrochemical fuel cells are complex systems that are costly to manufacture and to operate. A simpler and cheaper effective alternative to providing an auxiliary cell for rebalancing electrolytes in redox flow batteries is needed.

One approach that addresses the above issues is a method of rebalancing electrolytes in a redox flow battery system, comprising directing hydrogen gas generated on the negative electrode of the redox flow battery system to a catalyst surface, and fluidly contacting the hydrogen gas with the positive electrolyte comprising a metal ion at the catalyst surface. Such operation may occur with the positive metal ion chemically reduced by the hydrogen gas at the catalyst surface and/or a state of charge of the electrolyte substantially balanced. In one embodiment, the metal ion may comprise an imbalanced positive metal ion. In another embodiment, the electrolyte pH and the electrolyte state of charge remain substantially balanced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The present description relates to methods and systems for rebalancing electrolytes in a redox flow battery system. The description primarily describes an all-iron hybrid redox flow battery (IFB) as an example redox flow battery system, however the methods and systems for rebalancing electrolytes disclosed in the present description also apply to other types of redox flow batteries such as an iron/chromium redox flow battery system.

Figure 1:
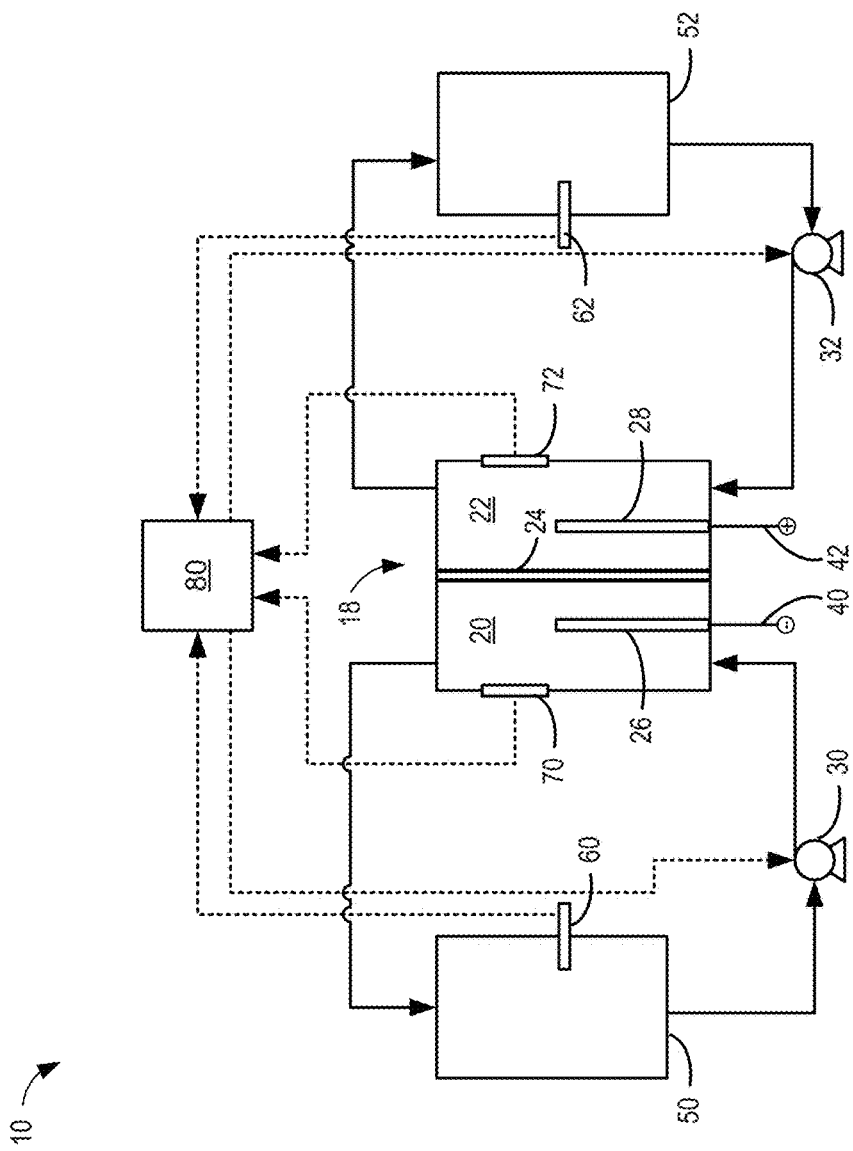
FIG. 1 is a schematic of an example of a redox flow battery.
Figure 2:
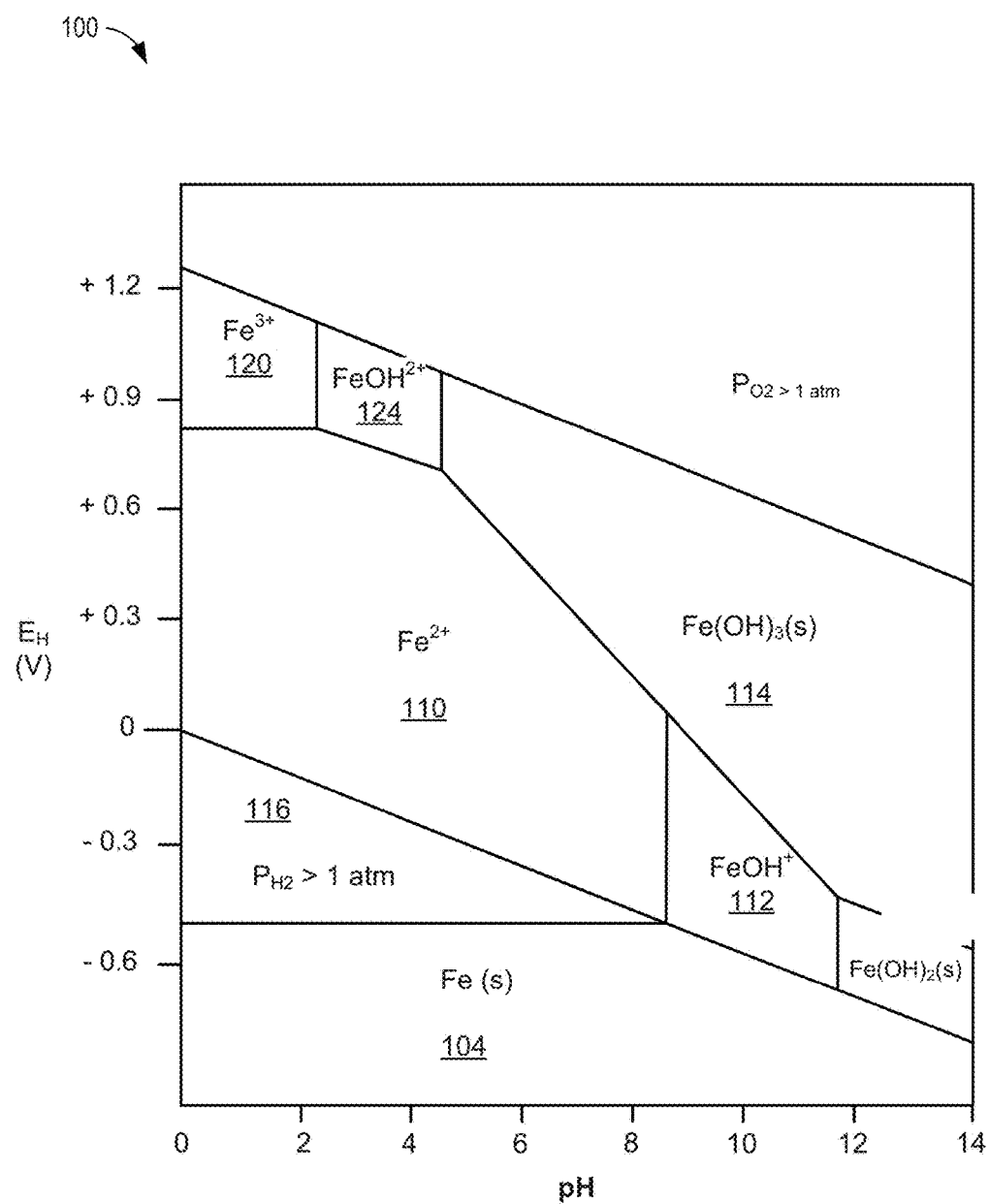
FIG. 2 is an example Pourbaix diagram for iron.
Figure 3:
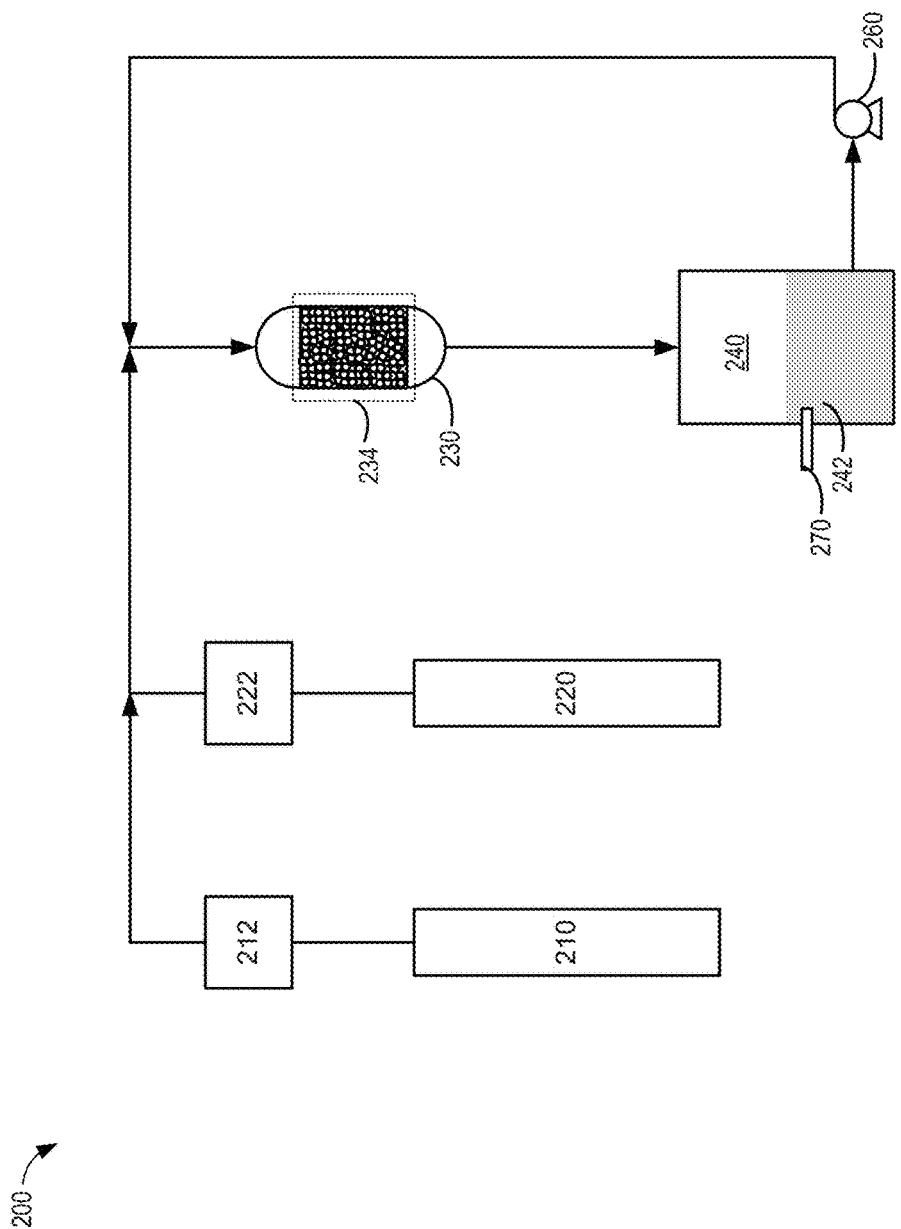
FIG. 3 is a schematic of an example process for testing a rebalancing reaction for a redox flow battery system.

FIG. 1 illustrates an example schematic for a redox flow battery. FIG. 2 illustrates a Pourbaix diagram for iron, showing the impact of changing electrolyte pH on electrolyte stability. FIG. 3 illustrates an example process for testing a rebalancing reaction for rebalancing electrolytes in a redox flow battery system. FIGS. 4-7 show example graphs of test data used for characterizing the rebalancing reaction for rebalancing electrolytes in a redox flow battery system. FIGS. 8-11 illustrates example embodiments of systems and methods for rebalancing electrolytes in redox flow battery systems, and FIG. 12 is a flowchart for an example method of rebalancing electrolytes in redox flow battery systems.

Referring now to FIG. 1, operation of a redox flow battery system 11 is described. The reduction-oxidation (redox) flow battery is an electrochemical storage device that stores energy in a chemical form and converts the stored chemical energy to an electrical form via spontaneous reversible redox reactions. The reaction in a flow battery is reversible, so conversely, the dispensed chemical energy can be restored by the application of an electrical current inducing the reverse redox reactions. A single redox flow battery cell 18 generally includes a negative electrode compartment 20, a separator 24, and a positive electrode compartment 22. The negative electrode compartment 20 may comprise a negative electrode 26, and a negative electrolyte comprising electro-active materials. The positive electrode compartment 22 may comprise a positive electrode 28, and a positive electrolyte comprising electro-active materials. In some examples, multiple cells 18 may be combined in series or parallel to create a higher voltage or current in a redox flow battery system. Electrolytes are typically stored in tanks external to the cell, and are pumped via pumps 30 and 32 through the negative electrode compartment 20 side and the positive electrode compartment 22 side of the battery, respectively. In the example of FIG. 1, the positive electrolyte is stored at a positive electrolyte source 52, which may comprise an external positive electrolyte tank, and the negative electrolyte is stored at a negative electrolyte source 50, which may comprise a second external tank. The separator 24 may comprise an electrically insulating ionic conducting barrier which prevents bulk mixing of the positive electrolyte and the negative electrolyte while allowing conductance of specific ions therethrough. For example, the separator 24 may comprise an ion-exchange membrane or a microporous membrane.

When a charge current is applied to the battery terminals 40 and 42, the positive electrolyte is oxidized (lose one or more electrons) at the positive electrode 28, and the negative electrolyte is reduced (gain one or more electrons) at the negative electrode 26. During battery discharge, reverse redox reactions occur on the electrodes. In other words, the positive electrolyte is reduced (gain one or more electrons) at the positive electrode 28, and the negative electrolyte is oxidized (lose one or more electrons) at the negative electrode 26. The electrical potential difference across the battery is maintained by the electrochemical redox reactions in the positive electrode compartment 22 and the negative electrode compartment 20, and can induce a current through a conductor while the reactions are sustained. The amount of energy stored by a redox battery is limited by the amount of electro-active material available in electrolytes for discharge, depending on the total volume of electrolytes and the solubility of the electro-active materials.

During operation of a redox flow battery system, sensors and probes may monitor and control chemical properties of the electrolyte such as electrolyte pH, concentration, state of charge, and the like. For example, sensors 62 and 60 maybe be positioned to monitor positive electrolyte and negative electrolyte conditions at the positive electrolyte source 52 and the negative electrolyte source 50, respectively. As another example, sensors 72 and 70 may monitor positive electrolyte and negative electrolyte conditions at the positive electrode compartment 22 and the negative electrode compartment 20, respectively. Sensors may be positioned at other locations throughout the redox flow battery system to monitor electrolyte chemical properties and other properties.

For example a sensor may be positioned in an external acid tank (not shown) to monitor acid volume or pH of the external acid tank, wherein acid from the external acid tank is supplied via an external pump (not shown) to the redox flow battery system in order to reduce precipitate formation in the electrolytes. Additional external tanks and sensors may be installed for supplying other additives to the redox flow battery system. Sensor information may be transmitted to a controller 80 which may in turn actuate pumps 30 and 32 to control electrolyte flow through the cell 18, or to perform other control functions, as an example. In this manner, the controller 80 may be responsive to, one or a combination of sensors and probes.

Hybrid flow batteries are redox flow batteries that are characterized by the deposit of one or more of the electro-active materials as a solid layer on an electrode. Hybrid batteries may, for instance, include a chemical that plates via an electrochemical reaction as a solid on a substrate throughout the battery charge process. During battery discharge, the plated species may ionize via an electrochemical reaction, becoming soluble in the electrolyte. In hybrid battery systems, the charge capacity (e.g., amount of energy stored) of the redox battery may be limited by the amount of metal plated during battery charge and may accordingly depend on the efficiency of the plating system as well as the available volume and surface area available for plating.

In a hybrid flow battery system the negative electrode 26 may be referred to as the plating electrode and the positive electrode 28 may be referred to as the redox electrode. The negative electrolyte within the plating side (e.g., negative electrode compartment 20) of the battery may be referred to as the plating electrolyte and the positive electrolyte on the redox side (e.g. positive electrode compartment 22) of the battery may be referred to as the redox electrolyte.

Anode refers to the electrode where electro-active material loses electrons and cathode refers to the electrode where electro-active material gains electrons. During battery charge, the positive electrolyte gains electrons at the negative electrode 26; therefore the negative electrode 26 is the cathode of the electrochemical reaction. During discharge, the positive electrolyte loses electrons; therefore the negative electrode 26 is the anode of the reaction. Accordingly, during charge, the negative electrolyte and negative electrode may be respectively referred to as the catholyte and cathode of the electrochemical reaction, while the positive electrolyte and the positive electrode may be respectively referred to as the anolyte and anode of the electrochemical reaction. Alternatively, during discharge, the negative electrolyte and negative electrode may be respectively referred to as the anolyte and anode of the electrochemical reaction, while the positive electrolyte and the positive electrode may be respectively referred to as the catholyte and cathode of the electrochemical reaction.

For simplicity, the terms positive and negative are used herein to refer to the electrodes, electrolytes, and electrode compartments in redox battery flow systems.

One example of a hybrid redox flow battery is an all iron redox flow battery (IFB), in which the electrolyte comprises iron ions in the form of iron salts (e.g., $FeCl_2$, $FeCl_3$, and the like), wherein the negative electrode comprises metal iron. For example, at the negative electrode, ferrous ion, $Fe^{2+}$, receives two electrons and plates as iron metal on to the negative electrode 26 during battery charge, and iron metal, $Fe^0$, loses two electrons and re-dissolves as $Fe^{2+}$ during battery discharge. At the positive electrode, $Fe^{2+}$ loses an electron to form ferric ion, $Fe^{3+}$, during charge, and during discharge $Fe^{3+}$ gains an electron to form $Fe^{2+}$: The electrochemical reaction is summarized in equations (1) and (2), wherein the forward reactions (left to right) indicate electrochemical reactions during battery charge, while the reverse reactions (right to left) indicate electrochemical reactions during battery discharge:

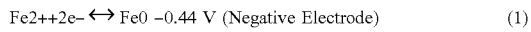
$$Fe2++2e- \leftrightarrow Fe0 \ -0.44 \text{ V (Negative Electrode)} \tag{1}$$

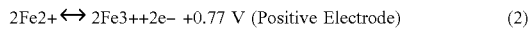
$$2Fe2+ \leftrightarrow 2Fe3++2e- \ +0.77 \text{ V (Positive Electrode)} \tag{2}$$

As discussed above, the negative electrolyte used in the all iron redox flow battery (IFB) may provide a sufficient amount of Fe2+ so that, during charge, Fe2+ can accept two electrons from the negative electrode to form Fe0 and plate onto a substrate. During discharge, the plated Fe0 may then lose two electrons, ionizing into Fe2+ and be dissolved back into the electrolyte. The equilibrium potential of the above reaction is −0.44V and thus this reaction provides a negative terminal for the desired system. On the positive side of the IFB, the electrolyte may provide Fe2+ during charge which loses electron and oxidizes to Fe3+. During discharge, Fe3+ provided by the electrolyte becomes Fe2+ by absorbing an electron provided by the electrode. The equilibrium potential of this reaction is +0.77V, creating a positive terminal for the desired system.

The IFB provides the ability to charge and recharge its electrolytes in contrast to other battery types utilizing non-regenerating electrolytes. Charge is achieved by applying a current across the electrodes via terminals 40 and 42. The negative electrode may be coupled via terminal 40 to the negative side of a voltage source so that electrons may be delivered to the negative electrolyte via the positive electrode (e.g., as Fe2+ is oxidized to Fe3+ in the positive electrolyte in the positive electrode compartment 22). The electrons provided to the negative electrode 26 (e.g., plating electrode) can reduce the Fe2+ in the negative electrolyte to form Fe0 at the plating substrate causing it to plate onto the negative electrode.

Discharge can be sustained while Fe0 remains available to the negative electrolyte for oxidation and while Fe3+ remains available in the positive electrolyte for reduction. As an example, Fe3+ availability can be maintained by increasing the concentration or the volume of the positive electrolyte to the positive electrode compartment 22 side of cell 18 to provide additional Fe3+ ions via an external source, such as an external positive electrolyte tank 52. More commonly, availability of Fe0 during discharge may be an issue in IFB systems, wherein the Fe0 available for discharge may be proportional to the surface area and volume of the negative electrode substrate as well as the plating efficiency. Charge capacity may be dependent on the availability of Fe2+ in the negative electrode compartment 20. As an example, Fe2+ availability can be maintained by providing additional Fe2+ ions via an external source, such as an external negative electrolyte tank 50 to increase the concentration or the volume of the negative electrolyte to the negative electrode compartment 20 side of cell 18.

In an IFB, the positive electrolyte comprises ferrous ion, ferric ion, ferric complexes, or any combination thereof, while the negative electrolyte comprises ferrous ion or ferrous complexes, depending on the state of charge of the IFB system. As previously mentioned, utilization of iron ions in both the negative electrolyte and the positive electrolyte allows for utilization of the same electrolytic species on both sides of the battery cell, which can reduce electrolyte cross-contamination and can increase the efficiency of the IFB system, resulting in less electrolyte replacement as compared to other redox flow battery systems.

Efficiency losses in an IFB may result from electrolyte crossover through the separator 24 (e.g., ion-exchange membrane barrier, micro-porous membrane, and the like). For example, ferric ions in the positive electrolyte may be driven toward the negative electrolyte by a ferric ion concentration gradient and an electrophoretic force across the separator. Subsequently, ferric ions penetrating the membrane barrier and crossing over to the negative electrode compartment 20 may result in coulombic efficiency losses. Ferric ions crossing over from the low pH redox side (e.g., more acidic positive electrode compartment 22) to high pH plating side (e.g., less acidic negative electrode compartment 20) can result in precipitation of Fe(OH)3. Precipitation of Fe(OH)3 can damage the separator 24 and cause permanent battery performance and efficiency losses. For example, Fe(OH)3 precipitate may chemically foul the organic functional group of an ion-exchange membrane or physically clog the small micro-pores of an ion-exchange membrane. In either case, due to the Fe(OH)3 precipitate, membrane ohmic resistance may rise over time and battery performance may degrade. Precipitate may be removed by washing the battery with acid, but the constant maintenance and downtime may be disadvantageous for commercial battery applications. Furthermore, washing may be dependent on regular preparation of electrolyte, an adding to process cost and complexity. Adding specific organic acids to the positive electrolyte and the negative electrolyte in response to electrolyte pH changes may also mitigate precipitate formation during battery charge and discharge cycling.

Additional coulombic efficiency losses may be caused by reduction of H+ (e.g., protons) and subsequent formation of H2 (e.g., hydrogen gas), and the reaction of protons in the negative electrode compartment 20 with electrons supplied at the plated iron metal electrode to form hydrogen gas.

The IFB electrolyte (e.g., FeCl2, FeCl3, FeSO4, Fe2(SO4)3, and the like) is readily available and can be produced at low costs. The IFB electrolyte offers higher reclamation value because the same electrolyte can be used for the negative electrolyte and the positive electrolyte, consequently reducing cross contamination issues as compared to other systems. Furthermore, owing to its electron configuration, iron may solidify into a generally uniform solid structure during plating thereof on the negative electrode substrate. For zinc and other metals commonly used in hybrid redox batteries, solid dendritic structures may form during plating. The stable electrode morphology of the IFB system may increase the efficiency of the battery in comparison to other redox flow batteries.

Further still, iron redox flow batteries reduce the use of toxic raw materials and can operate at a relatively neutral pH as compared to other redox flow battery electrolytes. Accordingly, IFB systems reduce environmental hazards as compared with all other current advanced redox flow battery systems in production.

Turning now to FIG. 2, it illustrates an example of a Pourbaix diagram. A Pourbaix diagram maps out possible stable equilibrium phases of an aqueous electrochemical system. The various solid lines in the Pourbaix diagram of FIG. 2 represent equilibrium conditions where the indicated species on either side of the line have the same chemical activity. Inside the regions on either side of the solid lines, the corresponding species predominates. In this way, Pourbaix diagrams can illustrate how pH changes can affect electrolyte species and stability in a redox flow battery system such as an IFB, leading to cycling performance losses over time. As an example, FIG. 2 shows a Pourbaix diagram 100 for iron. The vertical axis of FIG. 2 represents the potential with respect to the standard hydrogen electrode, while pH is represented on the horizontal axis. During charge of an IFB, for example, ferrous ion, Fe2+, is reduced (accepts two electrons in a redox reaction) to metal iron, Fe0, at the negative electrode. Simultaneously, at the positive electrode, ferrous ion, Fe2+, is oxidized (loss of an electron) to ferric ion, Fe3+. Concurrently, at the negative electrode, the ferrous iron reduction reaction competes with the reduction of protons, H+, wherein two protons each accept a single electron to form hydrogen gas, H2 and the corrosion of iron metal to produce ferrous ion, Fe2+. The production of hydrogen gas through reduction of hydrogen protons and the corrosion of iron metal are shown in equations (3) and (4), respectively:

$$H^+ + e^- \leftrightarrow \tfrac{1}{2}H_2 \text{ (proton reduction)} \qquad (3)$$

$$Fe^0 + 2H^+ \leftrightarrow Fe^{2+} + H_2 \text{ (iron corrosion)} \qquad (4)$$

As a result, the negative electrolyte in the negative electrode compartment 20 tends to stabilize at a pH range between 3 and 6, wherein formation of ferrous hydroxide ion (FeOH+) at 112, precipitation of ferric hydroxide, Fe(OH)3 at 114, and hydrogen evolution at 104 are all reduced. At the positive electrode compartment 22, ferric ion, Fe3+, has a much lower acid disassociation constant (pKa) than that of ferrous ion, Fe2+. Therefore, as more ferrous ions are oxidized to ferric ions, the positive electrolyte tends to stabilize at a pH less than 2, in particular at a pH closer to 1 within region 120.

Accordingly, maintaining the positive electrolyte pH in a first range in which the positive electrolyte (positive electrode compartment 22) remains stable and maintaining the negative electrolyte pH in a second range in which the negative electrolyte (negative electrode compartment 20) remains stable may reduce low cycling performance and increase efficiency of redox flow batteries. For example, maintaining a pH of a negative electrolyte in an IFB between 3 and 4 may reduce iron corrosion reactions and increase iron plating efficiency, while maintaining a pH of a positive electrolyte less than 2, in particular less than 1, may promote the ferric/ferrous ion redox reaction and reduce ferric hydroxide formation.

As indicated by equation (3) and (4), evolution of hydrogen can cause electrolyte imbalance in a redox flow battery system. For example, during charge, electrons flowing from the positive electrode to the negative electrode (e.g., as a result of ferrous ion oxidation), may be consumed by hydrogen evolution via equation (3), thereby reducing the electrons available for plating given by equation (1). Because of the reduced plating, battery charge capacity is reduced. Additionally, corrosion of the iron metal further reduces battery capacity since a decreased amount of iron metal is available for battery discharge. Thus, an imbalanced electrolyte state of charge between the positive electrode compartment 22 and the negative electrode compartment 20 can develop as a result of hydrogen production via reaction (3) and (4). Furthermore, hydrogen gas production resulting from iron metal corrosion and proton reduction both consume protons, which can result in a pH increase of the negative electrolyte. As discussed above with reference to FIG. 2, an increase in pH may destabilize the electrolyte in the redox batter flow system, resulting in further battery capacity and efficiency losses.

An approach that addresses the electrolyte rebalancing issues that can be caused by hydrogen gas production in redox flow battery systems comprises reducing the imbalanced ion in the positive electrolyte with hydrogen generated from the side reactions. As an example, in an IFB system, the positive electrolyte comprising ferric ion may be reduced by the hydrogen gas according to equation (5):

$$Fe^{3+} + \tfrac{1}{2}H_2 \rightarrow Fe^{2+} + H^+ \qquad (5)$$

In the IFB system example, by reacting ferric ion with hydrogen gas, the hydrogen gas can be converted back to protons, thereby maintain a substantially constant pH in the negative electrode compartment 20 and the positive electrode compartment 22. Furthermore, by converting ferric ion to ferrous ion, the state of charge of the positive electrolyte in the positive electrode compartment 22 may be rebalanced with the state of charge of the negative electrolyte in the negative electrode compartment 20. Although equation (5) is written for rebalancing electrolytes in an IFB system, the method of reducing an electrolyte with hydrogen gas may be generalized by equation (6):

$$M^{x+} + \frac{(x-z)}{2}H_2 \rightarrow M^{Z+} + (x-z)H^+ \qquad (6)$$

In equation (6), M x+ represents the positive electrolyte M having ionic charge, x, Mz+ represents the reduced electrolyte M having ionic charge, z.

A catalyst comprising graphite or comprising supported precious metal (e.g., carbon-supported Pt, Rd, Ru, or alloys thereof) catalyst may increase the rate of reaction described by equation (5) for practical utilization in a redox flow battery system. As an example, hydrogen gas generated in the redox flow battery system may be directed to a catalyst surface, and hydrogen gas and electrolyte (e.g., comprising ferric ion) may be fluidly contacted at the catalyst surface, wherein the hydrogen gas chemically reduces the ferric ion to ferrous ion and produces positive hydrogen ions (e.g., protons). As described above, the catalyst surface may comprise graphite. In some examples, the reaction described by equation (5) may proceed at a faster rate when the catalyst comprises a precious metal-based catalyst, such as carbon-supported Pt, Rd, Ru, or alloys thereof. As an example, in cases where the partial pressure of hydrogen gas (e.g. hydrogen gas concentration) is high and when a slower rate of reaction can be tolerated, the less costly graphite catalyst may be used. On the other hand, a small amount (e.g., 0.2 to >0.5 wt %) of precious metal catalyst supported on carbon can increase the rate of reaction as compared to using a graphite catalyst. Different types of catalysts, such as Pt, Pd, Ru or alloys of the above, and the like, and different amounts (0.2 to >0.5 wt %) thereof can be utilized depending on a reaction speed for any specific battery system. Furthermore, alloys of the catalyst can be utilized to reduce cost and increase corrosion stability of the catalyst. For example 10% addition of rhodium to platinum can reduce the corrosion of platinum by the ferric ion by over 98% (Handbook of Corrosion Data, Bruce D. Craig, David S. Anderson).

Turning now to FIG. 3, it illustrates a schematic of an example process for testing a rebalancing reaction for a redox flow battery system, for example, an IFB, according to equation (5). As shown in FIG. 3, electrolyte solution 242 comprising a metal ion (e.g., ferric ion) of known concentration may be pumped from an electrolyte source 240 (e.g., a storage tank) at a measured flow rate to a trickle bed reactor 230. A hydrogen gas source 220 (e.g., a hydrogen gas cylinder) may supply hydrogen gas to the trickle bed reactor 230 at a flow rate regulated by a metering device 222, for example, a rotameter. In addition an inert diluent, for example argon gas, may be supplied from a diluent source 210 to the trickle bed reactor 230 at a flow rate regulated by a metering device 212, for example, a rotameter. The electrolyte solution comprising the metal ion (e.g. ferric ion solution) may be mixed with the entering hydrogen and diluent gases at the inlet of the trickle bed reactor 230, thereby flowing through the trickle bed reactor 230 as a gas-liquid mixture. The trickle bed reactor 230 comprises a packed catalyst bed 234, the packed catalyst bed 234 comprising closely-packed catalyst particles. The closely-packed catalyst particles may comprise interparticle and intraparticle pores through which fluid(e.g., liquid, gas, or a mixture thereof) can flow and in which fluids can fluidly contact the surfaces of the catalyst particles. For example, the catalyst bed 234 may comprise carbon-supported precious metal catalyst particles and/or graphite catalyst particles. As the gas-liquid mixture of hydrogen, diluent, and electrolyte flow downwards over the catalyst bed 234, the hydrogen gas and the liquid electrolyte are fluidly contacted over the surfaces of the catalyst bed 234. Because the catalyst bed 234 comprises packed catalyst particles with interparticle and intraparticle pores, the catalyst surface area per volume of catalyst exposed for fluidly contacting the hydrogen gas and the liquid electrolyte can be increased, thereby facilitating the reaction therebetween. Furthermore, because the gas-liquid mixture of hydrogen gas and liquid electrolyte trickles through the catalyst bed 234, a contact time for fluidly contacting the hydrogen gas and the liquid electrolyte can be increased, thereby facilitating the reduction of the metal ion by the hydrogen gas at the catalyst surface according to equations (5) or (6).

The reaction products of the trickle bed reactor 230 are returned to the electrolyte source 240. A sensor 270 may comprise one or a plurality of sensors and/or measurement devices to measure chemical properties of electrolyte solution 242. As an example, sensor 270 may comprise a potentiostat and a three-electrode sensor comprising a glassy carbon working electrode, a platinum mesh counter electrode, and an Ag/AgCl reference electrode for performing cyclic voltammetry to measure dynamic electrolyte concentration profiles. The potentiostat may be set at a scan rate of 1/minute to analyze the electrolyte solution 242. For the case of an IFB system, the electrolyte solution comprises ferric ion solution, and the cyclic voltammetry may determine the changes in ferric ion concentration in the electrolyte solution by measuring the ferric-to-ferrous reduction peak. Sensor 270 may further comprise a pH meter for measuring changes in the ferric ion solution pH during the test.

In order to characterize the reaction kinetics of the ferric ion reduction reaction, a model for the trickle bed reactor 230 may be represented by equations (7)-(9):

$$-r' = N \frac{dX}{dW} \quad (7)$$

$$r' = r * \rho_{cat} \quad (8)$$

$$R = kC_{Fe3}^x * C_{H2}^y \quad (9)$$

where r'=rate of reaction (mol/s-g), r=rate of reaction (mol/s-l), N=molar flow (mol/s), dX=conversion (%), dW=weight of catalyst (g), $\rho_{cat}$=density of catalyst (g/l), C=concentration of species, k=reaction constant (1/s), x=the order of reaction on ferric ion concentration, and y=the order of reaction on hydrogen partial pressure.

Figure 4:
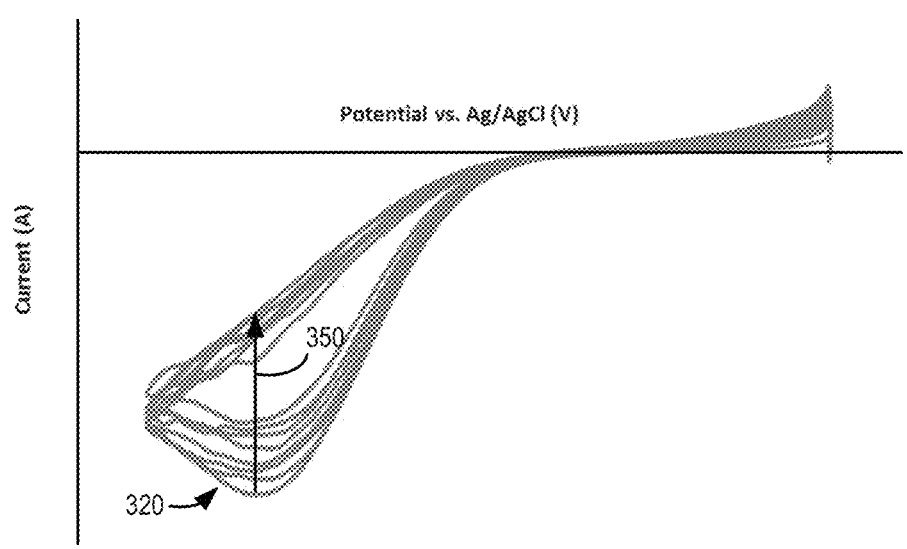
FIG. 4 is a graph showing an example cyclic voltammogram during a rebalancing reaction test for a redox flow battery system.
Figure 5:
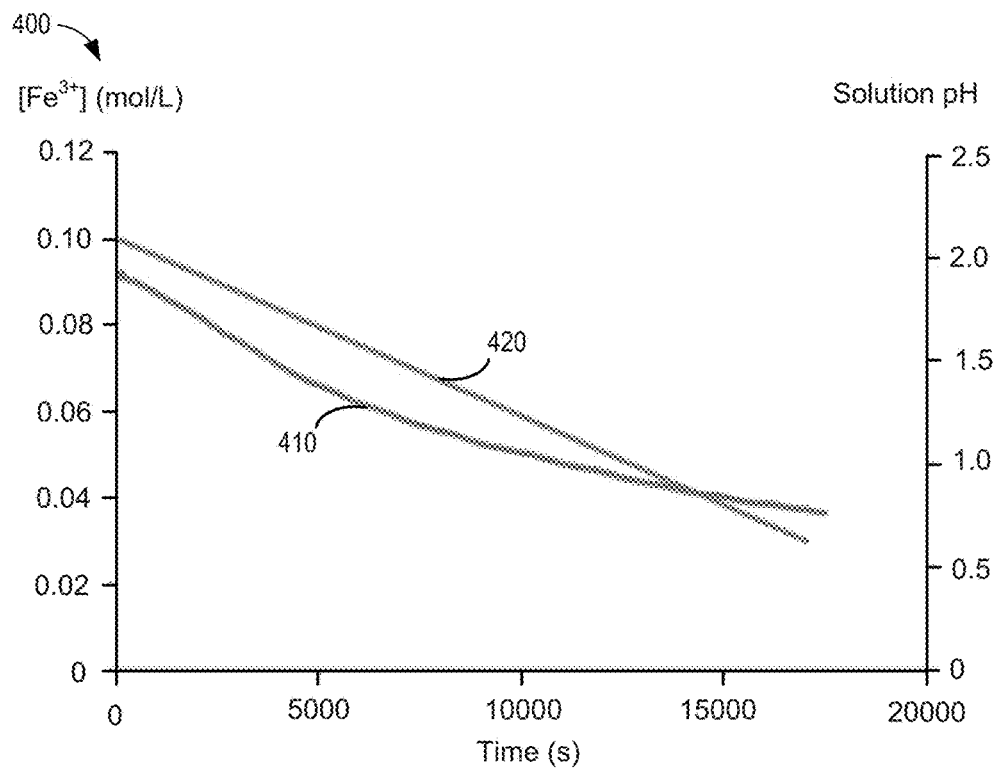
FIG. 5 is a graph showing an example solution metal ion and proton concentration profile during a rebalancing reaction test for a redox flow battery system.

An example of the test results is shown in FIGS. 4-5, where a ferric solution starting concentration was 0.1 mol/l and hydrogen partial pressure was 100%. Ferric solution flow rate was set to 0.00067 l/s. FIG. 4 illustrates a graph 300 plotting the measured current vs. the measured cell potential relative to the Ag/AgCl reference electrode. Graph 300 shows how the ferric to ferrous reduction peak 320 reduces as the reaction proceeds with time (indicated by arrow 350), suggesting a decreased ferric ion concentration with time. Since the peak height in the cyclic voltammogram is directly proportional to concentration, the ferric ion concentration change may be calculated from the ratio of cyclic voltammogram reduction peak change as the reaction proceeds. Furthermore, as ferric ion is reacted and as ferric ion concentration decreases as per equation (5), proton concentration concomitantly increases, causing a decrease in solution pH. The solution pH change with time may be monitored with a pH meter. FIG. 5 shows a graph 400 of the example test ferric ion concentration 410 and solution pH 420 profiles decreasing with time.

Using the above-described apparatus, a series of experiments may be carried out to characterize the reaction kinetics, in particular, to study how the reaction rate changes with ferric ion concentration and hydrogen partial pressure. In experiments carried out by the subject inventors, it was found that varying ferric ion concentration did not influence the reaction rate. Thus, it was determined that the order of the reaction (equation (5)) with respect to ferric ion concentration was zero (e.g., x=0 in equation (9)).

Figure 6:
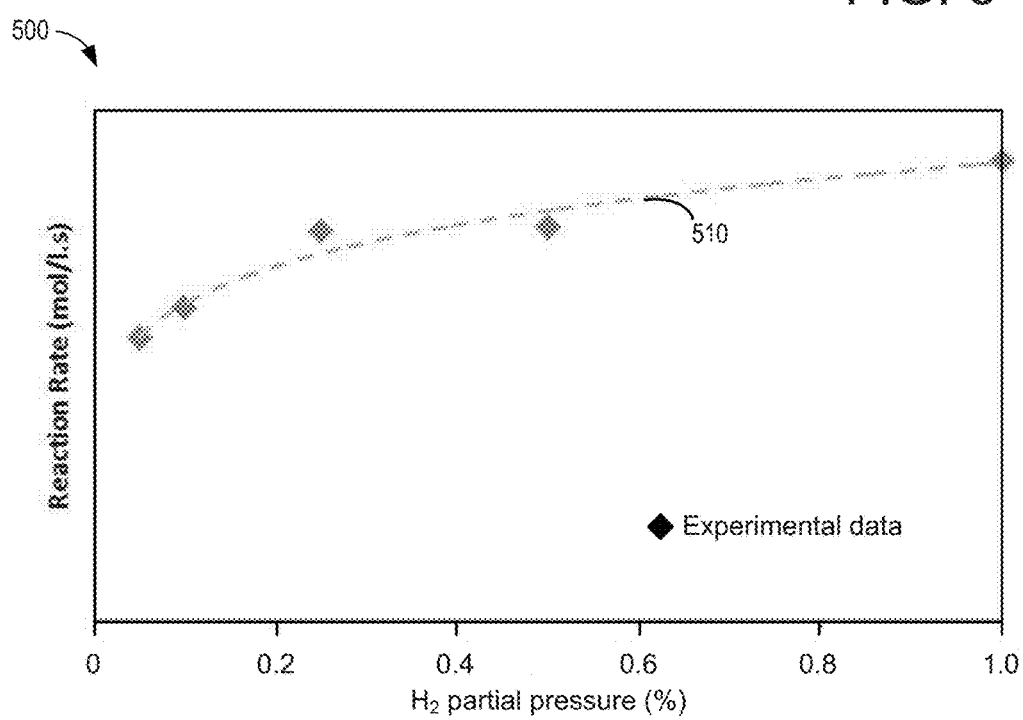
FIG. 6 is a graph showing an example rebalancing reaction rate dependence on hydrogen concentration.

Next, FIG. 6 illustrates a graph 500 showing the reaction rate dependence on hydrogen partial pressure. In the test experiments for determining the order of the reaction with respect to hydrogen partial pressure, the hydrogen gas partial pressure was varied by adjusting the flow rate of inert argon diluent gas. The dashed line 510 is a fitted trend line based on the experimental data (solid diamonds) and may aid in determining the order of the reaction with respect to hydrogen partial pressure (e.g., y in equation (9)). The order of the reaction with respect to hydrogen partial pressure may aid in battery operation because hydrogen concentration may decrease with time as it reacts with ferric ions.

Figure 7:
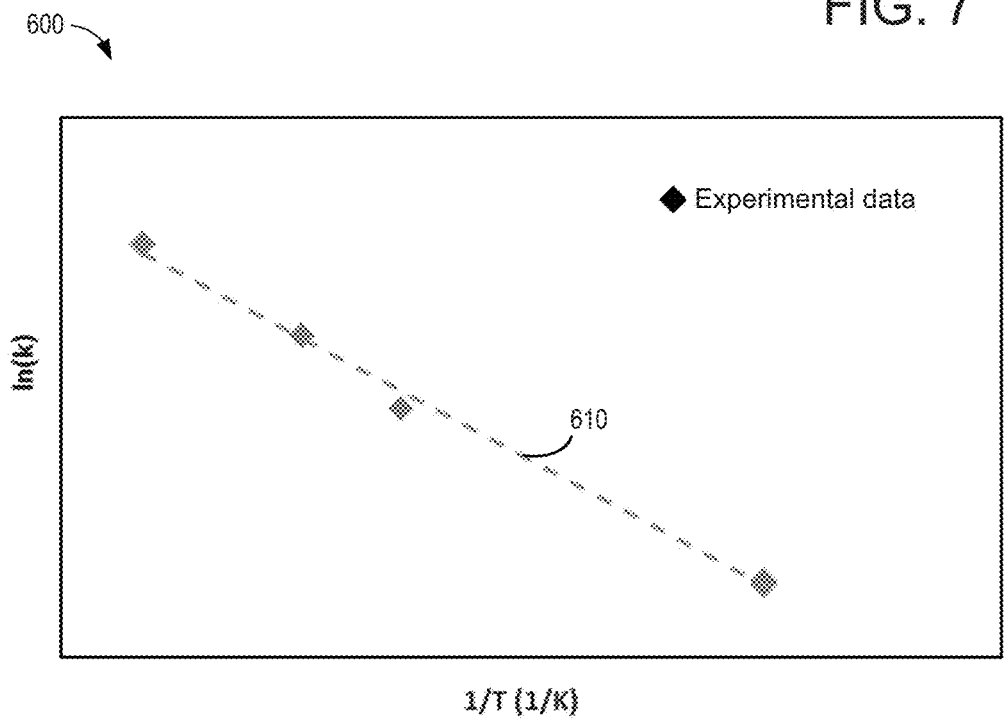
FIG. 7 is a graph showing an example rebalancing reaction Arrhenius plot.

Next, FIG. 7 illustrates an Arrhenius plot 600 showing how the ferric reduction reaction by hydrogen gas is affected by reaction temperature. Experimental data shown in FIG. 7 may be generated from utilizing the experimental test setup of FIG. 3 by varying the ferric ion concentration and hydrogen partial pressure, and varying the reaction temperature. The reaction temperature may be varied by heating or cooling the trickle bed reactor 230 and the catalyst bed 234, the electrolyte source 240, and the hydrogen gas source 220, or a combination thereof, as an example. Using equations (7)-(9), the reaction rate constant, k, may be calculated at each reaction condition (e.g., ferric ion concentration, hydrogen partial pressure, temperature, rate of reaction). The reaction rate constant, k, may be modeled using an Arrhenius form:

$$k = A * e^{\frac{-E_a}{RT}} \quad (10)$$

where A is a pre-exponential factor, R is the universal gas constant, T is the temperature in kelvin, and $E_a$ is the activation energy for the reaction. By plotting the experimental data as a natural log of the reaction rate constant, k, against the inverse reaction temperature measured in kelvin, and by fitting a linear trend line 610 to the plotted data, the reaction rate constant parameters, A and $E_a$, may be determined from the ln(k) intercept and the slope of a fitted linear trend line, respectively. Determining the reaction rate constant activation energy may help to increase the efficiency of a rebalancing method and system for rebalancing electrolytes in a redox flow battery system. For example, after determining the reaction rate parameters for the hydrogen reduction of an electrolyte metal ion (e.g., ferric ion in an IFB), an efficiency of an electrolyte rebalancing method and system may be increased.

Figure 8:
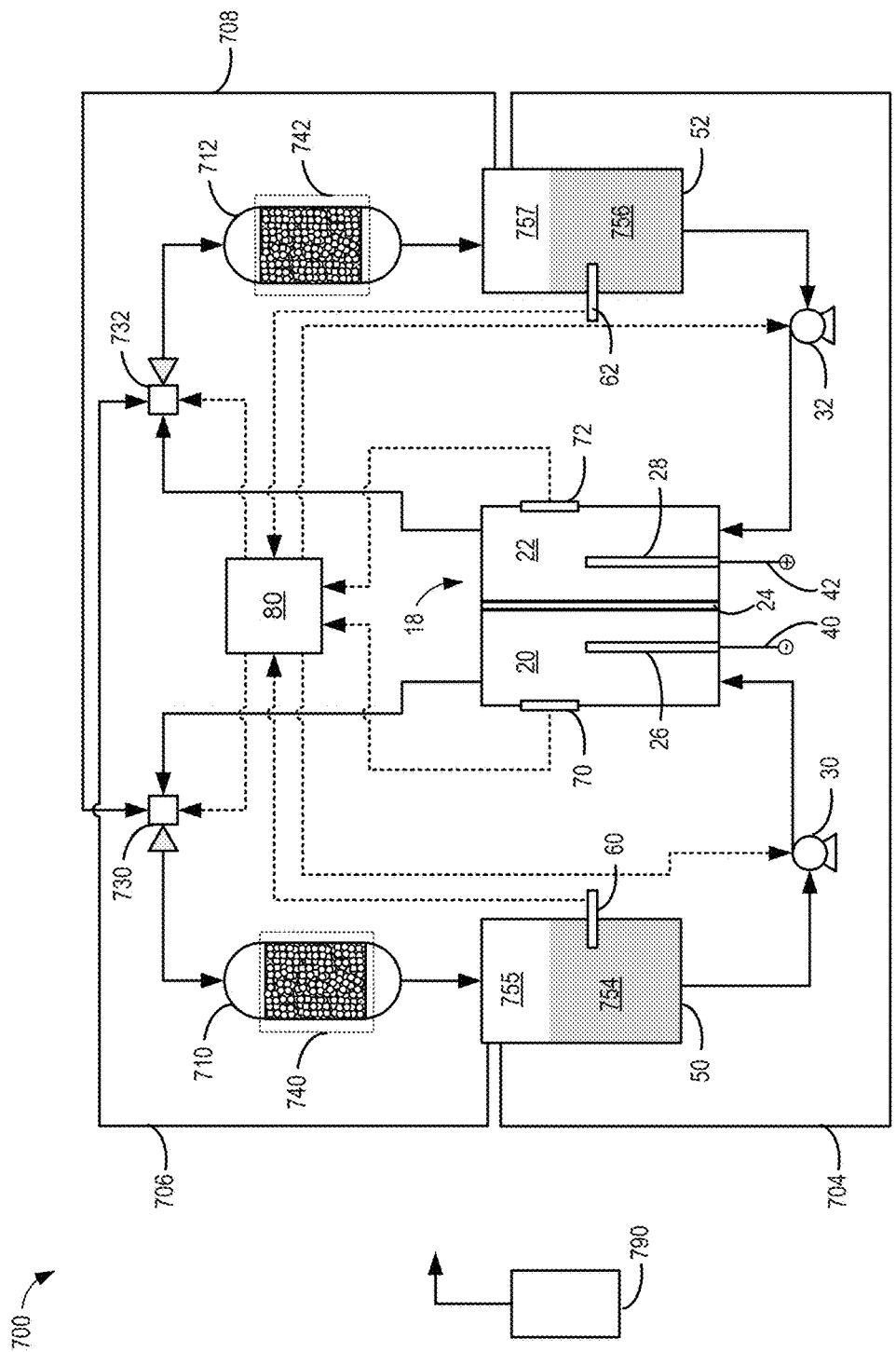
FIG. 8 is a schematic showing an example apparatus for rebalancing a redox flow battery system.

Turning now to FIG. 8, it illustrates an example redox flow battery system 700 comprising a redox flow battery cell. FIG. 8 includes some of the same elements as the redox flow battery system shown in FIG. 1. Elements in FIG. 8 that are the same as elements in FIG. 1 are labeled with the same numeric identifiers. For the sake of brevity, a description of same elements between FIG. 1 and FIG. 8 may be omitted; however, the description of elements in FIG. 1 applies to the elements in FIG. 8 that have the same numerical identifiers. As shown in FIG. 8, positive electrolyte source 52 and negative electrolyte source 50 may each hold liquid electrolyte comprising positive electrolyte 756 and negative electrolyte 754, respectively. As shown in FIG. 8, positive electrolyte 756 may recirculate through the positive electrode compartment 22, and negative electrolyte 754 may recirculate to the negative electrode compartment 20. In the redox flow battery system 700, the positive electrolyte source 52 and the negative electrolyte source 50 may both purged with inert gas such as Ar to remove oxygen gas. The purged electrolytes may be pumped via pumps 32 and 30 through the positive and negative sides of the battery, respectively. The positive and negative sides of the battery may refer to the positive electrode compartment 22 and the negative electrode compartment 20. Two trickle bed reactors 710, 712 comprising catalyst beds 740, 742 respectively, may be connected in-line with the recirculating flow paths of the electrolyte at the negative and positive sides of the battery, respectively, in the redox flow battery system 700. In one example, the trickle bed reactors 710, 712 may be placed in the flow path of the positive and negative electrolyte sources 50 and 52.

During battery charge, gaseous hydrogen may be generated on the negative side of the battery (e.g., at negative electrode 26) due to both electrochemical and corrosion side reactions (equations (3), and (4)) as previously described. Equation (4) is written for corrosion of iron metal electrode, for example in an IFB system, however, corrosion of other metals producing hydrogen gas may also occur in other types of hybrid redox flow battery systems or other redox flow battery systems. The hydrogen generated from the electrochemical and corrosion side reactions may accumulate at the negative electrolyte source 50 and the positive electrolyte source 52. A pressure equalization line 704 may connect negative source 50 and positive electrolyte source 52, thereby equating a pressure between a gas head spaces 757 and 755 of positive and negative electrolyte sources, respectively. In this manner, hydrogen gas may be distributed to the recirculating flow paths of the electrolyte at the negative and positive sides of the battery, respectively. In particular, the hydrogen gas may be supplied to the trickle bed reactors 710, 712. Ejectors 730 and 732 may be located between the outlet of the negative electrode compartment 20 and the positive electrode compartment 22 of battery cell 18 and trickle bed reactors 710 and 712, respectively. Ejectors 730 and 732 may deliver a predetermined amount or flow rate of hydrogen gas to trickle bed reactors 710 and 712, respectively. Ejectors 730, 732 may be connected to the gas head space 757 of positive source 52 and the gas head space 755 of negative electrolyte source 50. For example, negative electrolyte flowing from the negative electrode compartment 20 may pass through ejector 730, thereby drawing gas (e.g., hydrogen gas) from gas head space 757 of positive electrolyte source 52, and positive electrolyte flowing from the positive electrode compartment 22 may pass through ejector 732, thereby drawing gas (e.g., hydrogen gas) from gas head space 755 of negative electrolyte source 50. The sizes of ejectors 730 and 732 may be predetermined based on a predetermined amount of hydrogen generated and a predetermined speed of the reduction reaction. For example, the sizes of ejectors 730 and 732 may be increased to increase the hydrogen gas flow to the trickle bed reactors 710, 712, respectively, relative to the flow of electrolyte recirculated by pumps 30, and 32, respectively. In some examples, the sizes of ejectors 730, and 732 may be different, the sizes of each ejector predetermined according to the predetermined hydrogen flow rates to trickle bed reactors 710 and 712. For example, in an IFB, because the ferric ion concentration may be higher in the positive electrolyte at the positive side of the redox flow battery system, a larger portion of the hydrogen gas may be drawn through ejector 732. As a further example, the ejectors may be sized according to the reaction rate parameters determined as discussed above for equation (9) and system conditions such as reaction temperature. As a further example, ejectors 730 and 732 may also comprise mechanical pumps for delivering liquid electrolyte and hydrogen gas to trickle bed reactors 710 and 712, respectively, wherein the mechanical pumps may be controlled by controller 80.

Because the amount of generated hydrogen in the redox flow battery system may be approximately equal to the amount of unbalanced ferric ions, recirculating the generated hydrogen to both the positive electrolyte source 52 (and positive electrode compartment 22) and the negative electrolyte source 50 (and negative electrode compartment 20), may aid in completely rebalancing the electrolytes. For example, recirculating the generated hydrogen to the negative electrolyte source 50 may aid in rebalancing free ferric ions that crossover through separator 24 from the positive electrode compartment 22.

Redox flow battery system 700 may further comprise an external source 790 of hydrogen gas. External source 790 may supply additional hydrogen gas to the positive electrolyte source 52 and the negative electrolyte source 50. External source 790 may alternately supply additional hydrogen gas to the inlet of trickle bed reactors 710, 712. As an example, a mass flow meter or other flow controlling device (which may be controlled by controller 80) may regulate the flow of the hydrogen gas from external source 790. The external source of hydrogen may supplement the hydrogen gas generated in redox flow battery system 700. For example, when gas leaks are detected in redox flow battery system 700 or when the reduction reaction rate is too low at low hydrogen partial pressure, an external source of hydrogen gas may be supplied in order to rebalance the state of charge of the electro-active species in the positive electrolyte and negative electrolyte. As an example, controller 80 may supply hydrogen gas from external source 790 in response to a measured change in pH or in response to a measured change in state of charge of an electrolyte or an electro-active species. For example an increase in pH of the negative electrolyte source 50, or the negative electrode compartment 20, may indicate that hydrogen is leaking from the redox flow battery system 700 and/or that the reaction rate is too slow with the available hydrogen partial pressure, and controller 80, in response to the pH increase, may increase a supply of hydrogen gas from external source 790 to the redox flow battery system 700. As a further example, controller 80 may supply hydrogen gas from external source 790 in response to a pH change, wherein the pH increases beyond a first threshold pH or decreases beyond second threshold pH. For example, a first threshold pH for the negative electrolyte may be 4 and a second threshold pH for the negative electrolyte may be 3. In other words if the pH for the negative electrolyte is measured beyond a first range (e.g., less than 3 or greater than 4), then controller 80 may adjust (e.g., increase or decrease, or shut off, etc.) the external hydrogen gas supply rate to return the pH to the first range. As another example, if the pH of the negative electrolyte is greater than 4, then controller 80 may increase the external gas supply rate to supply additional hydrogen to increase the rate of reduction of ferric ions and the rate of production of protons, thereby reducing the positive electrolyte pH. Furthermore, the negative electrolyte pH may be lowered by hydrogen reduction of ferric ions crossing over from the positive electrolyte to the negative electrolyte or by proton generated at the positive side crossing over to the negative electrolyte due to a proton concentration gradient and electrophoretic forces. In this manner, the pH of the negative electrolyte may be maintained within the stable region from 3-4, while reducing the risk of precipitation of ferric ions (crossing over from the positive electrode compartment) to Fe(OH)3. Other control schemes for controlling the supply rate of hydrogen gas from external source 790 responsive to a change in an electrolyte pH or to a change in an electrolyte state of charge, detected by other sensors such as an oxygen-reduction potential (ORP) meter or an optical sensor, may be implemented. Further still, the change in pH or state of charge triggering the action of controller 80 may be based on a rate of change or a change measured over a time period. The time period for the rate of change may be predetermined or adjusted based on the time constants for the redox flow battery system. For example the time period may be reduced if the recirculation rate is high, and local changes in concentration (e.g., due to side reactions or gas leaks) may quickly be measured since the time constants may be small.

Figure 9:
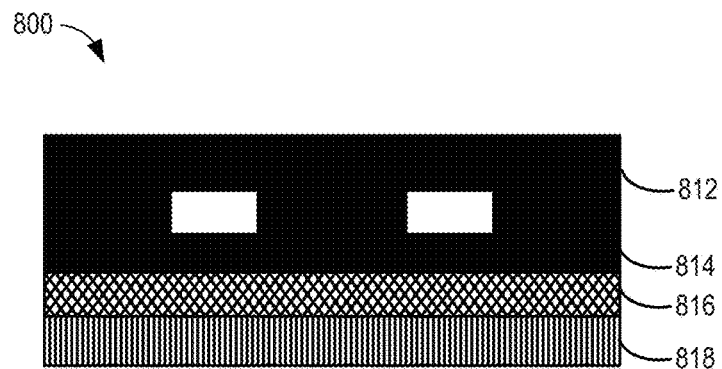
FIGS. 9-11 are schematics showing a cross-section of an example redox flow battery.

Turning now to FIG. 9, it shows a cross section of an example cell 800 of a redox flow battery system. As an example, a hybrid all-iron flow battery system is described with reference to FIG. 9, however example cell 800 may be representative for any redox flow battery system. Cell 800 may comprise a redox plate 812, comprising, for example, carbon or graphite. Cell 800 may further comprise a positive electrode 814 that may be positioned directly adjacent to the redox plate 812, and a negative electrode 818. As an example, the positive electrode 814 may comprise graphite. For the case of an IFB, negative electrode 818 may comprise a plating iron electrode. A separator 816, for example an ion-exchange membrane, may be positioned between to the positive electrode and the negative electrode, one surface of the separator 816 being immediately adjacent to the positive electrode, and another surface of the separator 816 being immediately adjacent to the negative electrode 818. In the cell 800, positive electrode 812 may comprise a positive electrode compartment containing a positive electrolyte therein, and a negative electrode 818 may comprise a negative electrode compartment containing a negative electrolyte therein. Furthermore, separator 816 may be an electrically insulating ion conducting barrier that separates a positive electrolyte recirculating through the positive electrode 814 and a negative electrolyte recirculating through the negative electrode 818. The positive electrolyte and the negative electrolyte may recirculate to the cell 800 from a positive electrolyte source (not shown) and a negative electrolyte source (not shown), respectively, via pumps (not shown), similar to the configuration of FIG. 8. For example, positive electrolyte and negative electrolyte may recirculate to and from the positive electrode 814 and negative electrode 818 in a direction perpendicular to the cross-section surface of FIG. 9. External sources (not shown) for supplying hydrogen, acids, additives, or combinations thereof to the cell 800 may also be provided.

For the case of a redox flow battery system comprising a plurality of cells stacked in series or in parallel, a redox plate of an adjacent redox flow battery cell may be positioned immediately adjacent to a back face of the negative electrode, wherein a back face of the negative electrode is opposite to the face of the negative electrode contacting separator 816.

In one example, cell 800 may comprise a cell for a hybrid redox flow battery system, for example, an IFB system. In an IFB system, the negative electrode 818 may include a substrate structure on which the iron metal, Fe0, may plate (solidify) during IFB charge, the positive electrolyte may comprise ferric ion, and ferrous ion, and the negative electrolyte may comprise ferrous ion. Accordingly, the positive electrolyte may comprise a first metal ion and the negative electrolyte may comprise a second metal ion, wherein an oxidation state of the first metal ion may be higher than an oxidation state of the second metal ion.

Figure 10:
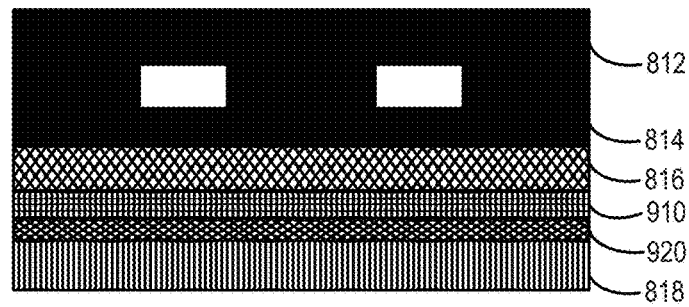
Figure 11:
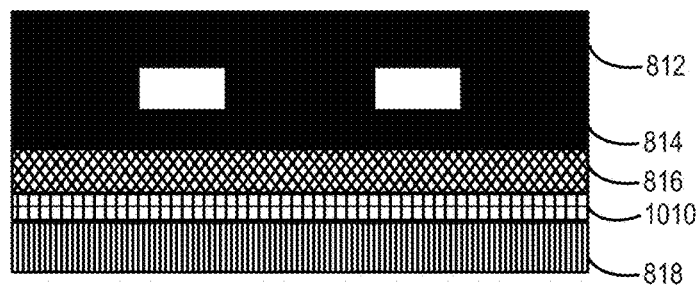
Figure 12:
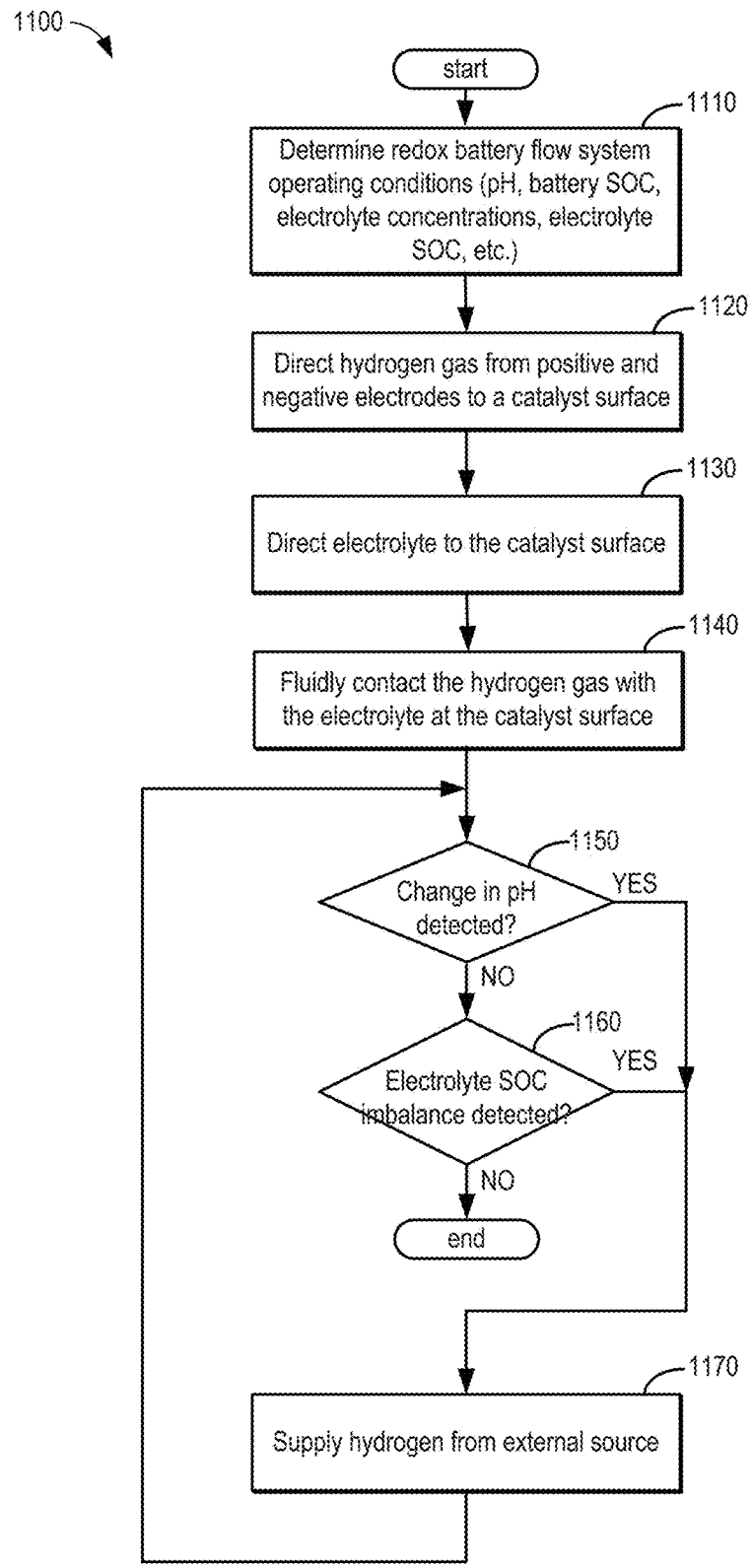
FIG. 12 is a flow chart for an example method of rebalancing electrolytes in a redox flow battery system.

FIGS. 10-11 include some of the same elements as the redox flow battery cell described shown in FIG. 9. Elements in FIGS. 10-11 that are the same as elements in FIG. 9 are labeled with the same numeric identifiers. For the sake of brevity, a description of same elements between FIG. 9 and FIGS. 10-11 may be omitted; however, the description of elements in FIG. 9 applies to the elements in FIGS. 10-11 that have the same numerical identifiers.

Turning now to FIG. 10, it illustrates a cross-section of an example redox flow battery cell 900 comprising a catalyst layer 910. Catalyst layer 910 may comprise a thin layer of catalyst that may catalyze the hydrogen reduction reaction (e.g., equation (6)). As previously discussed, the catalyst layer may comprise a graphite, or carbon-supported precious metal. The thin layer of catalyst may be applied to a surface of the separator 816 facing towards the negative electrode 818 using a method comprising spraying, doctor blade coating, screen printing, hot-pressing, and the like. For the case where the catalyst and the catalyst support are electrically conductive, an insulating barrier 920, for example, a micro-porous membrane, may be applied between the catalyst layer 910 and the negative electrode 818 to insulate the negative electrode 818 from the catalyst layer 910. Insulating barrier 920 may be electrically insulative, but may be permeable to fluids, including hydrogen gas generated at the negative electrode and the electrolyte.

Accordingly, in the redox flow battery cell 900, hydrogen generated at the negative electrode 818 may react with electro-active species such as a metal ion (e.g., ferric ion in an IFB system) at the interface between the separator 816 and the negative electrode 818. For example, ferric ions crossing over the separator 816 from the positive electrode 814 may be reduced by the hydrogen gas produced at the negative electrode. In this way, the hydrogen reduction reaction may occur at/or near the position where the hydrogen gas is generated so that the hydrogen gas may be quickly oxidized (e.g., when reducing ferrous ion to ferric ion) to produce protons. Thus, the redox flow battery cell 900 may more efficiently maintain a substantially balanced electrolyte state of charge and also more efficiently maintain a substantially stable electrolyte pH as compared to other redox flow battery cell configurations where the hydrogen reduction reaction for rebalancing the electrolytes takes place at a location further away from the negative electrode. For example, the redox flow battery system of FIG. 10 comprising catalyst layer 910 may achieve improved metal ion reduction reaction efficiency as compared to redox flow battery systems employing auxiliary rebalancing cells. As another example, the redox flow battery system of FIG. 10 comprising catalyst layer 910 may achieve improved metal ion reduction reaction efficiency as compared to redox flow battery systems employing external catalyst beds such as trickle bed reactors 740 and 742. In other examples a redox flow battery may employ a combination of an external catalyst bed such as trickle bed reactor 742, and an internal catalyst surface such as catalyst layer 910 to improve metal ion reduction reaction efficiency.

Turning now to FIG. 11, it illustrates a schematic of an example redox flow battery cell 1000 comprising a non-conductive supported catalyst layer 1010 positioned immediately adjacent to the separator 816 on the surface of the separator 816 facing the negative electrode 818. Non-conductive supported catalyst layer 1010 may comprise, for example, Al2O3, ceramic materials, and the like. Coating methods comprising spraying, doctor blade coating, screen printing, hot-pressing, and the like, or any combination thereof may be used to apply the non-conductive supported catalyst layer 1010 to the separator 816. Supporting the thin catalyst layer on a non-conductive support may simplify the redox flow battery cell 1000 as compared to the redox flow battery cell 900 because redox flow battery cell 1000 may not comprise an insulating barrier 920 between the catalyst layer and the negative electrode.

In this manner, a redox flow battery system may comprise a positive electrode in fluid communication with a positive electrolyte comprising a first metal ion, a negative electrode in fluid communication with a negative electrolyte comprising a second metal ion, an electrically insulating ion conducting surface separating the positive electrode from the negative electrode, and a catalyst surface in fluid communication with the first metal ion, the second metal ion, or a combination thereof, and hydrogen gas, wherein the hydrogen gas and the first metal ion, the second metal ion, or a combination thereof are fluidly contacted at the catalyst surface. The first metal ion may comprise a metal ion having a higher oxidation state, and the second metal ion may comprise a metal ion having a lower oxidation state. In one example, the redox flow battery system may comprise an iron redox flow battery system, the negative electrode may comprise an iron plating electrode, and the positive electrolyte and the negative electrolyte may comprise a ferric ion, ferrous ion, or a combination thereof. The redox flow battery system may further comprise an external source of hydrogen gas in fluid communication with the catalyst surface, and the catalyst may comprise a catalyst bed in a trickle bed reactor.

The redox flow battery system may further comprise a pump fluidly positioned between the positive electrode and the trickle bed reactor, wherein the pump supplies the hydrogen gas and the positive electrolyte to the trickle bed reactor. The pump may comprise an ejector, wherein a flow of the positive electrolyte through the ejector draws the hydrogen gas through the ejector to the trickle bed reactor, and the catalyst may comprise a catalyst layer positioned between the electrically insulating ion conducting surface and the negative electrode. The redox flow battery system may further comprise an electrically-insulative fluid-permeable substrate between the catalyst layer and the negative electrode, wherein the catalyst layer is disposed on the electrically-insulative fluid-permeable substrate. The catalyst layer may comprise one or more of a graphite catalyst layer and a precious metal-based catalyst layer.

Turning now to FIG. 12, it illustrates flowchart for an example method 1100 of rebalancing electrolytes in a redox flow battery system. Method 1100 begins at 1110, where redox flow battery system operating conditions may be determined. As an example, at 1110, electrolyte chemical properties including pH, battery state of charge, electrolyte concentrations, electrolyte state of charge, and the like may be measured using various sensors and/or probes (e.g., sensors 60, 62, 70, 72). As an example, the battery state of charge may be determined using an optical sensor, and the pH may be measured using a pH meter, and electrolyte concentration may be monitored using an ORP probe for measuring electrolyte potential. Next, method 1100 continues at 1120 where hydrogen gas may be directed from positive and/or negative electrodes to a catalyst surface. As an example, hydrogen that may be generated at a negative electrode from corrosion and/or electrochemical side reactions (e.g., equations (3)-(6)) may be directed to a catalyst surface via pumps and/or ejectors (e.g., ejectors 730, 732; pumps 30, 32). As a further example, hydrogen from an external source (e.g. external source 790) may be directed to a catalyst surface. The catalyst surface may comprise catalyst surfaces of a packed catalyst bed (e.g., 740 or 742) and/or a catalyst layer (e.g., 910 or 1010) positioned between the separator and the negative electrode. For the case of a catalyst layer, e.g., catalyst layer 910 or non-conductive supported catalyst layer 1010 is positioned relative to the negative electrode and/or positive electrode so that the hydrogen may be directed, or may be self-directed (e.g., hydrogen gas may rise) to the catalyst surface. Other catalyst surfaces that catalyze the hydrogen reduction reaction (e.g., equation (6)) may be employed. For example, the catalyst surface comprising a packed catalyst bed may include a packed catalyst bed within a reactor type other than a trickle bed reactor.

Next, method 1100 continues at 1130, where electrolyte may be directed to the catalyst surface. The electrolyte may comprise a positive electrolyte and/or a negative electrolyte, and the electrolyte may comprise one or multiple metal ions. The electrolyte may be directed to a catalyst surface via pumps and/or ejectors (e.g., ejectors 730, 732; pumps 30, 32). As a further example, electrolytes may be directed to a catalyst surface from an external source. As a further example, the catalyst surface may be positioned relative to the negative electrode and/or positive electrode so that the electrolyte may be directed, or may be self-directed (e.g., electrolyte may gravity flow) to the catalyst surface.

At 1140, method 1100 comprises fluidly contacting the hydrogen gas with the electrolyte at the catalyst surface. As an example, fluidly contacting the hydrogen gas with the electrolyte at the catalyst surface may comprise mixing the hydrogen gas with a liquid electrolyte and injecting the gas-liquid mixture into a trickle bed reactor, thereby fluidly contacting the gas-liquid mixture at a catalyst surface comprising a packed catalyst bed of a trickle bed reactor. As a further example, fluidly contacting the hydrogen gas with the electrolyte at the catalyst surface may comprise positioning a catalyst surface relative to a positive and/or negative electrode wherein hydrogen gas and electrolyte are each directed to and fluidly contact each other at the catalyst surface (e.g., fluidly contacting the hydrogen gas with electrolyte at the thin catalyst layer 910 or 1010).

Next, at 1150, method 1100 comprises determining if a change in pH is detected, for example, to control a negative electrolyte pH within a pre-determined range. Determining a pH change may comprise measuring a change in pH with an appropriate pH meter or other sensor and/or probe positioned, for example, at a battery cell or electrolyte source. Detecting a change in pH may comprise detecting a pH increase or a pH decrease. Furthermore, detecting a change in pH may comprise detecting a pH increase or pH decrease beyond a first pH range or a second pH range. For example, in an IFB, the first pH range may be from 3 to 4, corresponding to a pH range over which the negative electrolyte is stable, and the second pH range may be from 1 to 2, corresponding to a pH range over which the positive electrolyte is stable. As another example, the first pH range may correspond to a pH less than 4. The first pH range and the second pH range may be predetermined depending on the particular redox flow battery system. For example, a Pourbaix diagram may be used to predetermine the first pH range and the second pH range for the redox flow battery system.

If the detected pH is within the predetermined range, method 1100 continues at 1160, where it is determined if an electrolyte state of charge (SOC) imbalance is detected. Detecting an electrolyte SOC imbalance may comprise measuring a change in one or a plurality of electrolyte concentrations, measuring a change in one or a plurality of electrolyte SOC's, and the like. For example, if the total concentration of ferric ions in the positive electrolyte, indicated by its ORP, is substantially imbalanced with the total concentration of ferrous ions, indicated by its ORP, in the negative electrolyte in an IFB system, then an electrolyte SOC imbalance may be detected. As a further example, the electrolyte SOC imbalance may be determined by averaging measured electrolyte concentrations or electrolyte SOCs over a predetermined time interval. For example, during a predetermined time interval at a known charging or discharging current, the exact amount of electrons transferred in coulombs can be calculated by multiplying the charging or discharging current in Amperes by the predetermined time interval in seconds. Based on the total coulombs transferred and the positive and negative reactions for a redox flow battery system, changes in the amounts of species in the positive and negative electrolytes can be determined. If the measured electrolyte SOC does not balance with changes in the amounts of species calculated from the total coulombs transferred, then an electrolyte SOC imbalance may be determined. If an electrolyte SOC imbalance is not detected, method 1100 ends.

If a negative electrolyte pH is above the predetermined pH range at 1150, or an electrolyte SOC imbalance is detected at 1160, method 1100 continues at 1170, where external hydrogen may be supplied from an external source. For example, in an IFB, if the pH of the negative electrolyte increases beyond a first range corresponding to the range where the ferric ions is stable, hydrogen gas may be supplied (e.g., via a controller) to the IFB cell to drive the reduction of ferric ion at the catalyst surface. In this way, the supplied hydrogen gas from an external source may increase the hydrogen partial pressure at the catalyst surface, and may thereby speed up the hydrogen reduction of ferric ion at the catalyst surface, producing protons and reducing the pH of the positive electrolyte. A controller may also supply external hydrogen responsive to a detected electrolyte SOC imbalance. Supplied hydrogen gas from an external source may increase the rate of hydrogen reduction of ferric ion at the catalyst surface, thereby rebalancing the electrolyte SOC in the positive and negative electrolytes.

In this manner, a method of rebalancing electrolytes in a redox flow battery system may comprise directing hydrogen gas in the redox flow battery system to a catalyst surface, fluidly contacting the hydrogen gas with an electrolyte comprising a metal ion at the catalyst surface; and chemically reducing the metal ion by the hydrogen gas at the catalyst surface, wherein a state of charge of the electrolyte remains substantially balanced. In another example, a method of rebalancing electrolytes in a redox flow battery system may comprise directing hydrogen gas in the redox flow battery system to a catalyst surface, fluidly contacting the hydrogen gas with an electrolyte comprising a metal ion at the catalyst surface, and chemically reducing the metal ion by the hydrogen gas at the catalyst surface, wherein a pH of the electrolyte remains within a predetermined range. In a further example, a method of rebalancing electrolytes in a redox flow battery system may comprise directing hydrogen gas in the redox flow battery system to a catalyst surface, fluidly contacting the hydrogen gas with an electrolyte comprising a metal ion at the catalyst surface, and chemically reducing the metal ion by the hydrogen gas at the catalyst surface, wherein a state of charge of the electrolyte remains substantially balanced and a pH of the electrolyte remains within a predetermined range.

The methods of rebalancing electrolytes in a redox flow battery system may further comprise measuring a pH of the electrolyte and supplying hydrogen from an external source in response to a change in the pH of the electrolyte. The methods may further comprise measuring a state of charge of the electrolyte and supplying hydrogen from an external source in response to a change in the state of charge of the electrolyte. Further still, the redox flow battery system may comprise an iron redox flow battery system, and the metal ion may comprise ferric ion.

Directing the hydrogen gas to the catalyst surface may comprise directing the hydrogen gas to a catalyst bed in a trickle bed reactor, wherein fluidly contacting the hydrogen gas with the electrolyte at the catalyst surface comprises fluidly contacting the hydrogen gas with the electrolyte at the catalyst bed of the trickle bed reactor. Furthermore, the redox flow battery system may comprise a positive electrode and a negative electrode, wherein directing the hydrogen gas to the catalyst surface may comprise directing the hydrogen gas to a catalyst layer positioned at an electrically insulating ion conducting surface separating the positive electrode and the negative electrode.

In this manner, a method of operating a redox flow battery system may comprise recirculating a positive electrolyte to a positive electrode, recirculating a negative electrolyte to a negative electrode, directing hydrogen gas to a first catalyst surface, directing the positive electrolyte to the first catalyst surface, and fluidly contacting the hydrogen gas with the positive electrolyte at the first catalyst surface, wherein the positive electrolyte is chemically reduced by the hydrogen gas at the first catalyst surface, a positive electrolyte pH is maintained within a first range, and a state of charge of the positive electrolyte and a state of charge of the negative electrolyte remain substantially constant. The method may further comprise measuring the positive electrolyte pH, measuring the negative electrolyte pH, and supplying hydrogen gas from an external source to the redox flow battery system in response to at least one of a change in the positive electrolyte pH and the negative electrolyte pH. Directing hydrogen gas to a first catalyst surface may comprise directing the hydrogen gas to a first catalyst bed in a first trickle bed reactor, and wherein fluidly contacting the hydrogen gas with the positive electrolyte at the first catalyst surface comprises fluidly contacting the hydrogen gas with the positive electrolyte at the first catalyst bed in the first trickle bed reactor.

The method of operating the redox flow battery system may further comprise directing hydrogen gas to a second catalyst bed in a second trickle bed reactor, directing the negative electrolyte to the second catalyst bed, and fluidly contacting the hydrogen gas with the negative electrolyte at the second catalyst bed, wherein the negative electrolyte is chemically reduced by the hydrogen gas at the second catalyst surface, and a negative electrolyte pH is maintained within a second range. Directing hydrogen gas to a first catalyst surface may comprise directing the hydrogen gas to a catalyst layer adjacent to an electrically insulating ion conducting surface separating the positive electrode from the negative electrode.

As will be appreciated by one of ordinary skill in the art, the methods described in FIG. 12 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

It will also be appreciated that the configurations and routines disclosed herein are exemplary in nature, and that these specific embodiments are not to be considered in a limiting sense, because numerous variations are possible. For example, the above technology may be applied to other flow battery types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

This concludes the description. The reading of it by those skilled in the art would bring to mind many alterations and modifications without departing from the spirit and the scope of the description. For example, hybrid redox flow battery systems, all-iron hybrid redox flow battery systems, and other redox flow battery systems may all take advantage of the present description.

The invention claimed is:

1. A redox flow battery system, comprising:
a positive electrode in fluid communication with a positive electrolyte comprising a first metal ion;
a negative electrode in fluid communication with a negative electrolyte comprising a second metal ion, wherein during charging of the redox flow battery system, the negative electrode comprises metal plated on to the negative electrode resulting from reduction of the second metal ion;
an electrically insulating ion conducting surface separating the positive electrode from the negative electrode; and
a catalyst surface in fluid communication with
the first metal ion, the second metal ion, or a combination thereof, and
hydrogen gas, wherein the hydrogen gas and the first metal ion, the second metal ion, or a combination thereof are fluidly contacted at the catalyst surface.

2. The redox flow battery system of claim 1, wherein the first metal ion comprises a metal ion having a higher oxidation state, and wherein the second metal ion comprises a metal ion having a lower oxidation state.

3. A redox flow battery system, comprising:
a positive electrode in fluid communication with a positive electrolyte comprising a first metal ion;
a negative electrode in fluid communication with a negative electrolyte comprising a second metal ion;
an electrically insulating ion conducting surface separating the positive electrode from the negative electrode; and
a catalyst surface in fluid communication with
the first metal ion, the second metal ion, or a combination thereof, and hydrogen gas, wherein the hydrogen gas and the first metal ion, the second metal ion, or a combination thereof are fluidly contacted at the catalyst surface,
wherein the redox flow battery system comprises an iron redox flow battery system, the negative electrode comprises an iron plating electrode, and the positive electrolyte and the negative electrolyte comprise ferric ion, ferrous ion, or a combination thereof.

4. The redox flow battery system of claim 1, further comprising an external source of hydrogen gas in fluid communication with the catalyst surface.

5. The redox flow battery system of claim 1, wherein the catalyst comprises a catalyst bed in a trickle bed reactor.

6. The redox flow battery system of claim 5, further comprising a pump fluidly positioned between the positive electrode and the trickle bed reactor, wherein the pump supplies the hydrogen gas and the positive electrolyte to the trickle bed reactor.

7. The redox flow battery system of claim 6, wherein the pump comprises an ejector, wherein a flow of the positive electrolyte through the ejector draws the hydrogen gas through the ejector to the trickle bed reactor.

8. The redox flow battery system of claim 1, wherein:
the catalyst comprises a catalyst layer positioned between the electrically insulating ion conducting surface and the negative electrode.

9. The redox flow battery system of claim 8, further comprising an electrically-insulative fluid-permeable substrate between the catalyst layer and the negative electrode, wherein the catalyst layer is disposed on the electrically-insulative fluid-permeable substrate.

10. The redox flow battery system of claim 8, wherein the catalyst layer comprises one or more of a graphite catalyst layer and a precious metal-based catalyst layer.

11. The redox flow battery system of claim 1, wherein the redox flow battery system comprises an iron redox flow battery system, the negative electrode comprises an iron plating electrode, and the positive electrolyte and the negative electrolyte comprise ferric ion, ferrous ion, or a combination thereof.

12. The redox flow battery system of claim 3, wherein the catalyst comprises a catalyst bed in a trickle bed reactor.

13. The redox flow battery system of claim 12, further comprising a pump fluidly positioned between the positive electrode and the trickle bed reactor, wherein the pump supplies the hydrogen gas and the positive electrolyte to the trickle bed reactor.

14. The redox flow battery system of claim 13, wherein the pump comprises an ejector, wherein a flow of the positive electrolyte through the ejector draws the hydrogen gas through the ejector to the trickle bed reactor.

15. The redox flow battery system of claim 14, further comprising an external source of hydrogen gas in fluid communication with the catalyst surface.

16. The redox flow battery system of claim 15, wherein the external source of hydrogen gas comprises hydrogen gas supplemental to hydrogen gas generated in the redox flow battery system.

17. The redox flow battery system of claim 3, wherein:

the catalyst comprises a catalyst layer positioned between the electrically insulating ion conducting surface and the negative electrode.

18. The redox flow battery system of claim 17, further comprising an electrically-insulative fluid-permeable substrate between the catalyst layer and the negative electrode, wherein the catalyst layer is disposed on the electrically-insulative fluid-permeable substrate.

19. The redox flow battery system of claim 18, wherein the catalyst layer comprises one or more of a graphite catalyst layer and a precious metal-based catalyst layer.

* * * * *